(12) United States Patent
Qiu (10) Patent No.: US 8,159,371 B2
(45) Date of Patent: Apr. 17, 2012

(54) SYSTEMS AND METHODS FOR SEMI-AUTOMATIC DIALING FROM A MIXED ENTRY SEQUENCE HAVING NUMERIC AND NON-NUMERIC DATA

(75) Inventor: Weigen Qiu, Alberta (CA)

(73) Assignee: Zi Corporation of Canada, Inc., Calgary, Alberta (CA)

( * ) Notice: Subject to any disclaimer, the term of this patent is extended or adjusted under 35 U.S.C. 154(b) by 1160 days.

(21) Appl. No.: 11/955,353

(22) Filed: Dec. 12, 2007

(65) Prior Publication Data

US 2009/0154682 A1   Jun. 18, 2009

(51) Int. Cl.
*H03M 11/00* (2006.01)

(52) U.S. Cl. ....... 341/22; 341/20; 455/566; 379/355.01; 379/355.02

(58) Field of Classification Search ............... 341/20–35; 710/67, 73

See application file for complete search history.

(56) References Cited

U.S. PATENT DOCUMENTS

| | | | |
|---|---|---|---|
| 7,065,385 B2 * | 6/2006 | Jarrad et al. | 455/564 |
| 7,081,837 B2 | 7/2006 | Bollman | |
| 2005/0187754 A1 * | 8/2005 | Suess | 704/4 |
| 2006/0007128 A1 | 1/2006 | Fux et al. | |
| 2007/0004460 A1 * | 1/2007 | Tsampalis | 455/566 |
| 2007/0123235 A1 * | 5/2007 | Newport et al. | 455/414.2 |
| 2008/0055117 A1 | 3/2008 | Lee | |
| 2008/0300853 A1 | 12/2008 | Xiaoning | |
| 2008/0300861 A1 | 12/2008 | Emam et al. | |
| 2008/0317240 A1 * | 12/2008 | Chang et al. | 379/368 |

OTHER PUBLICATIONS

International Search Report and Written Opinion dated Jun. 4, 2009 for related application No. PCT/IB2008/003383.

* cited by examiner

*Primary Examiner* — Timothy Edwards, Jr.
*Assistant Examiner* — Franklin Balseca
(74) *Attorney, Agent, or Firm* — Michael A. Glenn; Glenn Patent Group (57) ABSTRACT

A system and method for semi-automated dialing is provided. The system includes a display, and a standard keyboard upon which some keys have both a numeric and alphabetic interpretation. An input is received from the keyboard. A determination is made if the input consists only from the keys that have both numeric and alphabetic interpretation. If this is the case, then a numeric analysis is performed. Otherwise, a word analysis is performed. The numeric analysis includes determining if the input has an alternate interpretation, and if so then displaying them so that the user may select the intended input. Determining alternate interpretations includes comparing the input with a dictionary. The word analysis includes searching for word matches between the received input and words in a dictionary, and then converting the matched words into numbers using telephone convention. Results from the analyses may be dialed.

20 Claims, 9 Drawing Sheets

SYSTEMS AND METHODS FOR SEMI-AUTOMATIC DIALING FROM A MIXED ENTRY SEQUENCE HAVING NUMERIC AND NON-NUMERIC DATA

BACKGROUND OF THE INVENTION

This invention relates generally to semi-automated dialer system and method to provide fast and efficient dialing from a mixed entry sequence. More particularly, the present invention relates to a method for determining intended entry from a mixed dialing sequence that includes both numeric and non-numeric input.

In mobile communications appliances equipped with a deterministic input device, such as a QWERTY keyboard, the large number of keys may be a disadvantage. To keep the number of physical keys to a smaller number, it is common to find that the numeric keys share the same physical keys as some of the text symbol keys. For example, in one such implementation on a Windows Smartphone®, the E, R, T and Y are also labeled 0, 1, 2 and 3, respectively.

The particular allocation of numerical keys on the alphabetic keypad is flexible by design, but most implementers attempt to construct a layout that approximates the numeric layout typical of a telephone keypad.

This ambiguous structure results in design choices that are contextually driven and it is usual to find that the keyboard operates either in numeric mode or in text symbol mode. However, there is limited interactivity between the two modes. Usually it is left to the user to determine which mode is desired.

Current dialer applications which signals a numeric string to the network system via the appliance's transceiver is ill conditioned to send strings that are not entirely numbers.

Similarly the fact that the text symbols normally allocated to the touch-tone keypad have no resemblance to the way that numbers are allocated to the qwerty layout results in an unexpected complexity for the typical user. For example, in voicemail systems it is usual for a caller to be asked to identify the recipient by entering a numeric string that ambiguously spells their surname or first part thereof. If there is an ambiguous possibility where more than one recipient could be intended, the system may resolve this interactively with the user. It is extraordinarily difficult for a user of a qwerty keyboard labeled with a group of numbers, having no other labeling to show the possible ambiguous meaning of the numeric keys in the context of a telephony application, to perform this entry task accurately. This is further exacerbated by the fact that the staggered key layout of a QWERTY keyboard lends a distortion to the numeric labeled keys, as if the standard telephony pad were not rectangular but more a parallelogram shape, which further complicates the ergonomic task.

It is therefore apparent that an urgent need exists for an improved system and method for semi-automated dialing using mixed sequences for input that is both accurate and efficient. This solution would fulfill a long felt, yet unmet, need for dialing applications that is able to effectively provide dialing when provided input that contains both numeric and non numeric input; thereby increasing effectiveness of dialing and number entry on a mobile device.

SUMMARY OF THE INVENTION

To achieve the foregoing and in accordance with the present invention, a method and system for semi-automated dialing is provided. Such a system is useful for a user of mobile devices to provide enhanced dialing accuracy and speed. Such enhanced dialing functionality may be helpful in cases of vanity and word-containing phone entries.

One advantage of the present invention is that it enables users to utilize the entire keypad on the mobile device when dialing a telephone number. Additionally, confusion associated with dialing a vanity style phone number may be avoided by allowing the user to enter an alphabetical entry for automated conversion into the proper numerical form.

The computer implemented method for semi-automated dialing includes a display, a standard keyboard upon which some keys have both a numeric and alphabetic interpretation and a microprocessor capable of dialing an input sequence from either the alphabetic or numeric keys or a combination of both.

An input from the keyboard is first received. The input includes a sequence of characters. A determination is made if the sequence of characters consists only of input from the keys that have both numeric and alphabetic interpretation. If this is the case, then a numeric analysis is performed on the sequence. Otherwise, a word analysis is performed on the sequence.

The numeric analysis includes determining if the received input has an alternate interpretation, and if so then displaying the received input and alternate interpretations. This may be determined by comparing the sequence of characters with a list of words stored in a dictionary. The dictionary may include a list of at least one vanity number used in a wide-area telephone service system. This list may be dynamically configured by remotely populating the list.

The user may then select the intended input, which is the dialed. If there are no alternate interpretations for the sequence, then the original input is dialed.

The word analysis includes searching for word matches between the received input and words in a dictionary. The matched words are then converted into numbers by utilizing telephone convention, and the numbers may then be dialed.

These and other features of the present invention may be practiced alone or in any reasonable combination and will be discussed in more detail below in the detailed description of the invention and in conjunction with the following figures.

BRIEF DESCRIPTION OF THE DRAWINGS

In order that the present invention may be more clearly ascertained, one embodiment will now be described, by way of example, with reference to the accompanying drawings, in which.

DETAILED DESCRIPTION OF THE INVENTION

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

Systems and methods for semi-automatic dialing from a mixed entry sequence having numeric and non-numeric data are provided. Such systems enable users of mobile devices that have keypads that have numeric and alphabetic inputs sharing the same physical key to efficiently and easily input either numeric, word or combination inputs and receive the intended dialing.

Such a system has particular use when dialing of "vanity" telephone numbers such as 1-800-FLOWERS. Typically, these vanity numbers are associated with the Wide-Area Telephone Service (WATS). This association may be leveraged in the present invention to enhance dialing functionality.

Also, the disclosed invention enables a reduction in confusion when requiring the user to enter numeric codes for alphabetical strings, such as when entering name information in an automated directory answering service.

A typical keypad layout of the telephony type assigns letter groups to each numeric key in alphabetical order traditionally, resulting in three letters per key between 2 and 9 except for the 7 key and 9 key which have four letters each assigned. This is the result of a historical anomaly where the letters Q and Z were originally assigned to the 1 key.

By contrast, the "full" keyboard has one symbol per letter in the Latin set and 12 keys are labeled with the numbers 0 through 9 and the characters * and # to correspond with the normal touch tone keys. When the phone is being used to dial a number, it is usual for the keyboard to be disabled with the exception of these numeric keys. This prevents invalid key codes from being passed to the dialer application.

It would be advantageous if instead of requiring the user to use the format of the telephone keypad to spell any letter sequence such as "FLOWERS" by pressing 3569377 (the number sequence that contains these letters ambiguously), the appliance were able to recognize that the word created by the alpha function of the keyboard might be ambiguated to match the letter allocation of the standard touch tone keypad. In this way the entry of FLOWERS from the QWERTY keypad might be automatically resolved to a number sequence without the user having to ignore the printed labels of the normal keyboard and attempt to recall the layout of the telephone keypad.

In a further aspect of the invention, it is inevitable that some word structures will incorporate some of the keys which are the same keys that have a numeric value allocated to them. Although there may be many possibilities to how the groups of keys may be allocated to numeric values, the requirement that the allocation resemble a telephone keypad combined with the distribution of letter values in a typical QWERTY keypad layout means that a great many words will incorporate a key that is both an alpha key and a numeric key. Because the invention may couple a dictionary mechanism with the input, a means of discerning which context a key is used in may be provided.

Much of the discussion contained herein will refer to text as words containing letters from the Roman alphabet. The discussion and examples utilizing Roman alphabet letters is purely exemplary in nature. The present invention is intended to also extend to alternate languages where symbols, glyphs or characters are strung together to produce text. For example, in Chinese a particular string of traditional calligraphic symbols, known as the Zhuyin or BoPoMoFo alphabet, may be compiled as to create a character. In Japanese, beyond the ideographic Kanji characters lie a pair of syllabaries called the Kana, and these too are covered by the present invention. Likewise, the present invention may extend to standard Romanization systems, such as Pinyin for Mandarin. It will be seen that the exemplified system and method for semi-automated dialer is versatile enough to apply not only to Roman alphabets, but any language's symbology.

Figure 1:
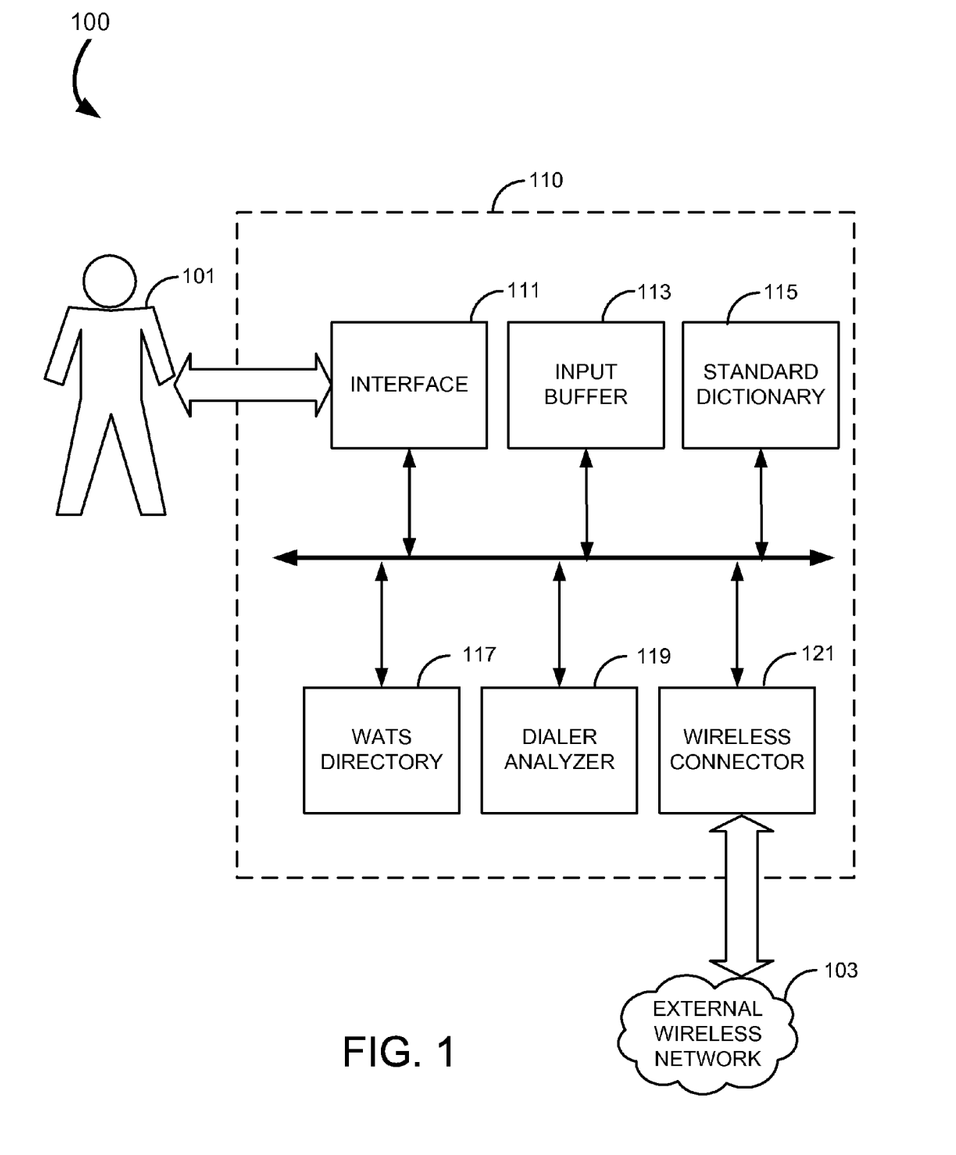
FIG. 1 shows a logical block diagram of the semi-automated dialer system in accordance with an embodiment of the present invention.

FIG. 1 shows a logical block diagram of the semi-automated dialer system, shown generally at 100. A User 101 and an External Wireless Network 103 may be seen, each coupled with a Mobile Device 110. The Mobile Device 110 includes an Interface 111, an Input Buffer 113, a Standard Dictionary 115, a WATS Directory 117, a Dialer Analyzer 119 and a Wireless Connector 121 each coupled to one another.

The User 101 may access the Mobile Device 110 via the Interface 111. Similarly, the Mobile Device 110 may access the External Wireless Network 103 via the Wireless Connector 121. The User 101 may enter the input via the Interface 111. The input is then buffered by the Input Buffer 113 during processing by the Dialer Analyzer 119. The Dialer Analyzer 119 utilizes dictionary lookup of possible words utilizing the Standard Dictionary 115 and WATS Directory 117.

The Standard Dictionary 115 preexists in most mobile devices, and contains, on average, 10,000 to 100,000 words. The word amounts often depend upon memory requirements as compared to functionality, and as such, different word numbers may be included within the Standard Dictionary 115.

The WATS Directory 117 may be populated with data from the Wide-Area Telephone Service (WATS) database. In some embodiment, the WATS Directory 117 may be populated remotely, and may be dynamically configurable as the list of numbers within the WATS system changes. The WATS Directory 117 may be particularly useful since certain initial sequences are known part of the wide area (WATS) systems (such as 1-800, 1-900, 1-866 and so forth) and it may be assumed that these may have mnemonic, vanity associations and the appliance may display both numeric and non-numeric candidates for user selection.

After analysis of the User 101 input by the Dialer Analyzer 119, the final number may be dialed via the Wireless Connector 121. It should be noted that the Mobile Device 110 may include more or fewer components as becomes desirable to extend battery life, processing speed, storage, and functionality.

Figure 2:
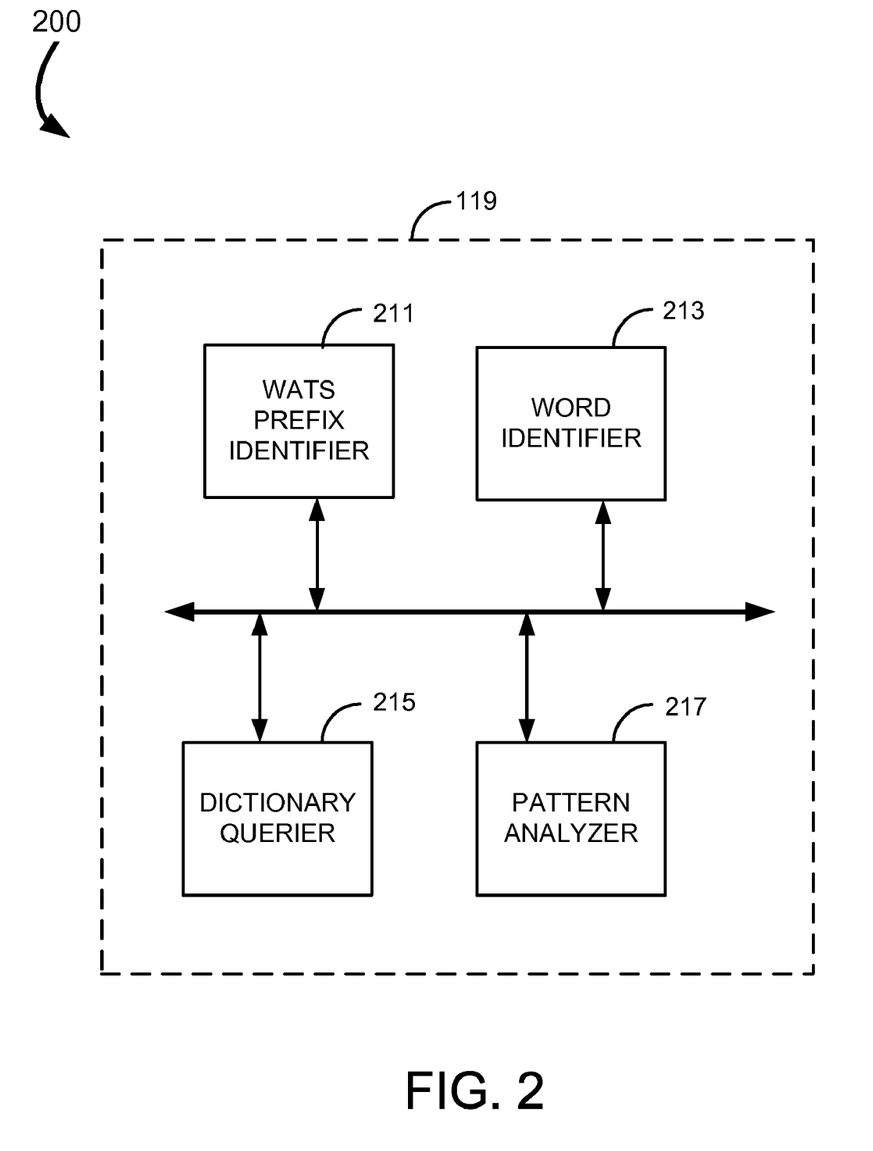
FIG. 2 shows a logical block diagram of the dialer analyzer of the semi-automated dialer system.

FIG. 2 shows a logical block diagram of the Dialer Analyzer 119 of the semi-automated dialer system. The Dialer Analyzer 119 may include a WATS Prefix Identifier 211, a Word Identifier 213, a Dictionary Querier 215 and a Pattern Analyzer 217. The WATS Prefix Identifier 211 analyzes input from the User 101 for WATS prefixes, such as 1-800, 1-900, 1-866 and so forth.

The Word Identifier 213 may identify input that matches words. In some embodiments, this may be preformed on a basic level by simply searching for direct dictionary matches. The Dictionary Querier 215 may query the Standard Dictionary 115 for these matches. If a WATS prefix was identified by the WATS Prefix Identifier 211, the Dictionary Querier 215 may additionally query the WATS Directory 117.

In some embodiments, the Word Identifier 213 may include advanced functionality, including but not limited to, spelling correction ability and phonetic matching. For example, the letter "U" is often substituted in vanity style telephone numbers for the phonetically identical word "you". Likewise, the numbers 1, 4 and 2 may be substitutes for the words "one", "for" and "to", respectively. The incorporation of these shorthand inputs may frustrate basic dictionary lookups by the Word Identifier 213. Sequences that contain these phonetically significant characters may generally have a logical structure that uses letter or word sequences before and after the embedded phonetically significant character.

Likewise, in some embodiments, the Word Identifier 213 may be able to have spellchecking functionality. It should be noted, however, that many vanity style telephone word sequences are purposefully misspelled. Thus, such spellchecking may be preformed after traditional analysis if there are no matches to the sequence as inputted by the User 101.

In some embodiments, the Pattern Analyzer 217 may analyze the User 101 inputs to determine a pattern of usage. If the User 101 inputs a particular vanity telephone number, it is likely that the User 101 will reuse the same number in the future. Thus, particular inputs may be initially analyzed, and the resulting dialed number may be saved for future recall. Thus, when the User 101 inputs the identical sequence in the future, the Dictionary Querier 215 need not reanalyze the input. Instead the saved entry may be recalled, thereby saving on processing requirements, speed and in some cases the need for further User 101 interactivity. The same principles hold for when calling a main line to access an extension by entering the name of the individual.

Figure 3:
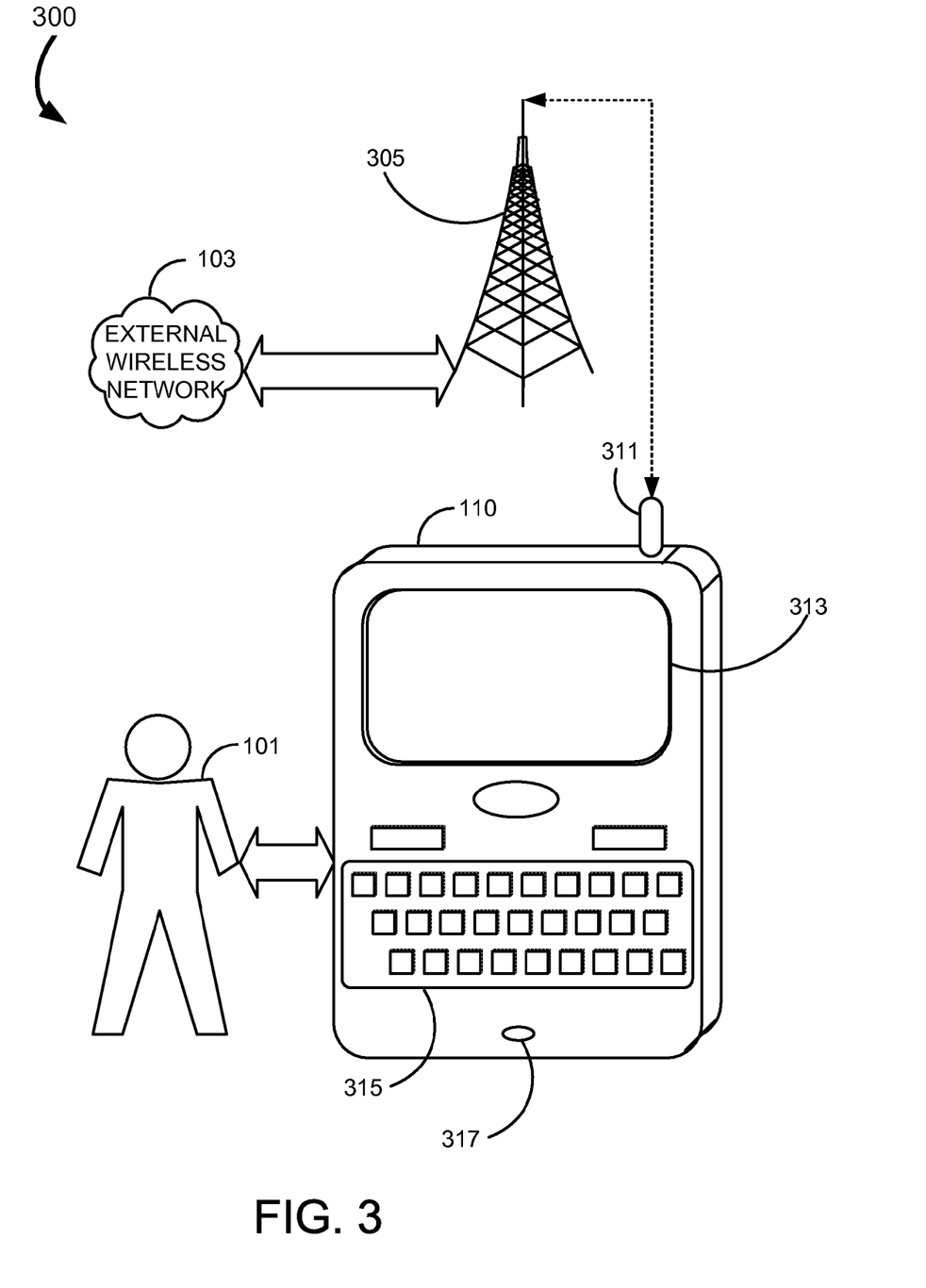
FIG. 3 shows an illustration of a user interaction with a wireless mobile device in accordance with an embodiment of the present invention.

FIG. 3 shows an illustration of the User 101 interaction with the Mobile Device 110, shown generally at 300. As previously noted, the User 101 may interact with the Mobile Device 110 via the Interface 111. The Interface 111 includes, as shown here, a Screen 313, a Deterministic Keypad 315 and an Audio Interface 317. Of course additional components of the Interface 111 may be included, such as biometric inputs, joystick, mouse inputs, or touch pad inputs.

The Wireless Connector 121 may include an Antenna 311, which may transmit a signal wirelessly to a Wireless Intermediate 305. The Wireless Intermediate 305 may include a wireless cellular receiving tower, an access point, or any additional wireless receiver. The Wireless Intermediate 305 may then provide connectivity to the External Wireless Network 103.

Figure 4:
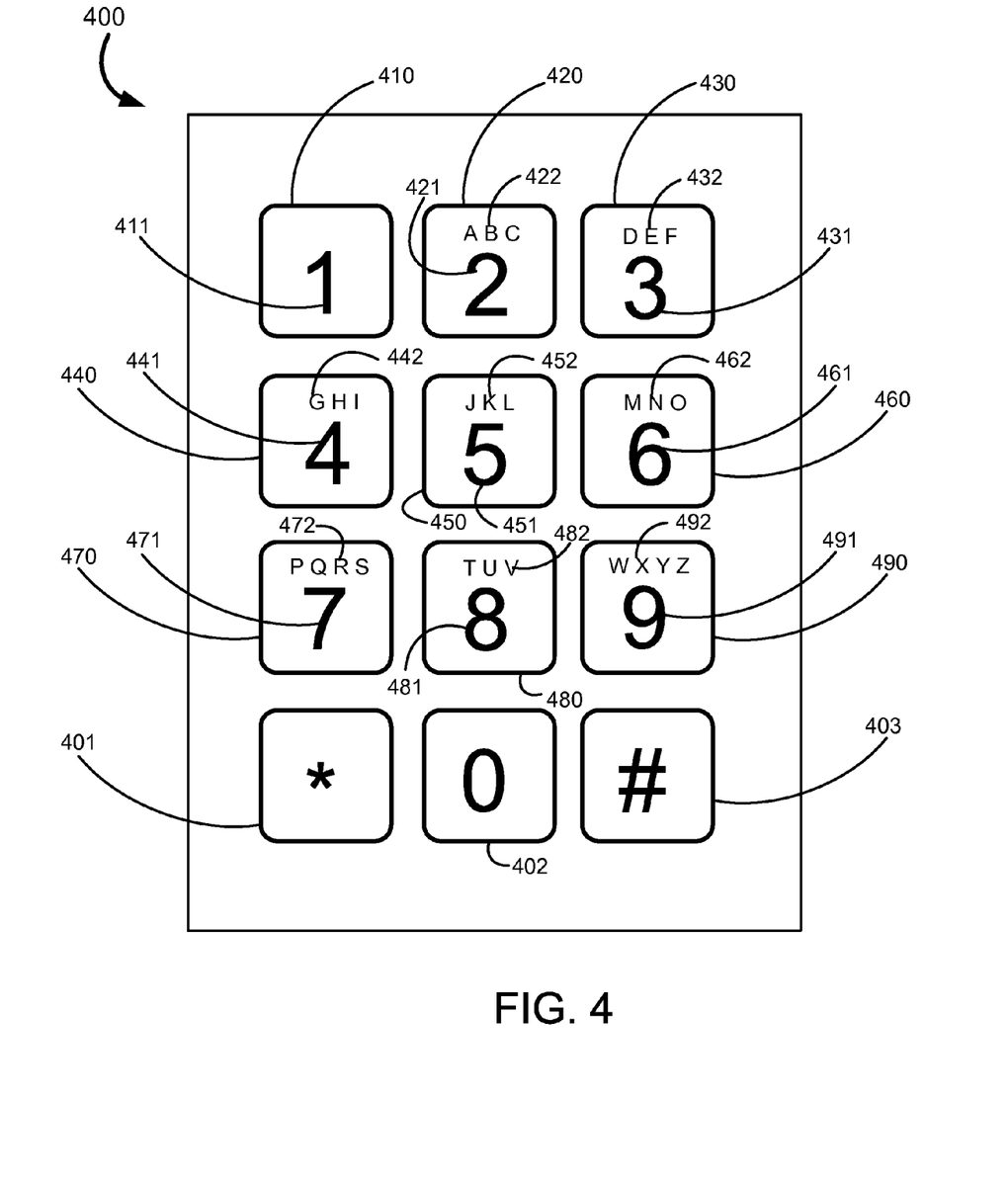
FIG. 4 shows an illustration of an ambiguous style keypad associated with a mobile device in accordance with an embodiment of the present invention.

FIG. 4 shows an illustration of an ambiguous style keypad, or traditional telephone keypad, associated with a traditional telephone, shown generally at 400. The ambiguous style keypad has twelve keys, shown at 401, 402, 403, 410, 420, 430, 440, 450, 460, 470, 480 and 490, respectively. In an ambiguous keypad, each Numerical Key 410, 420, 430, 440, 450, 460, 470, 480, 490 contains both a Numeral 411, 421, 431, 441, 451, 461, 471, 481, 491, and a set of three or four Letters 422, 432, 442, 452, 462, 472, 482, 492. The non-numeric Keys 401, 402 and 403 may likewise include characters and symbols, such as punctuation and spaces.

The ambiguous Keypad may rely upon the number of times any particular Numerical Key 410, 420, 430, 440, 450, 460, 470, 480, 490 is pressed to generate a specific letter, or character. Alternatively, in some embodiments, the device may interpret a string of key hits and disambiguate the intended letters. Lastly, in some embodiments, a combined system of multiple key hits and disambiguation may be utilized for text entry into an ambiguous keypad.

Figure 5:
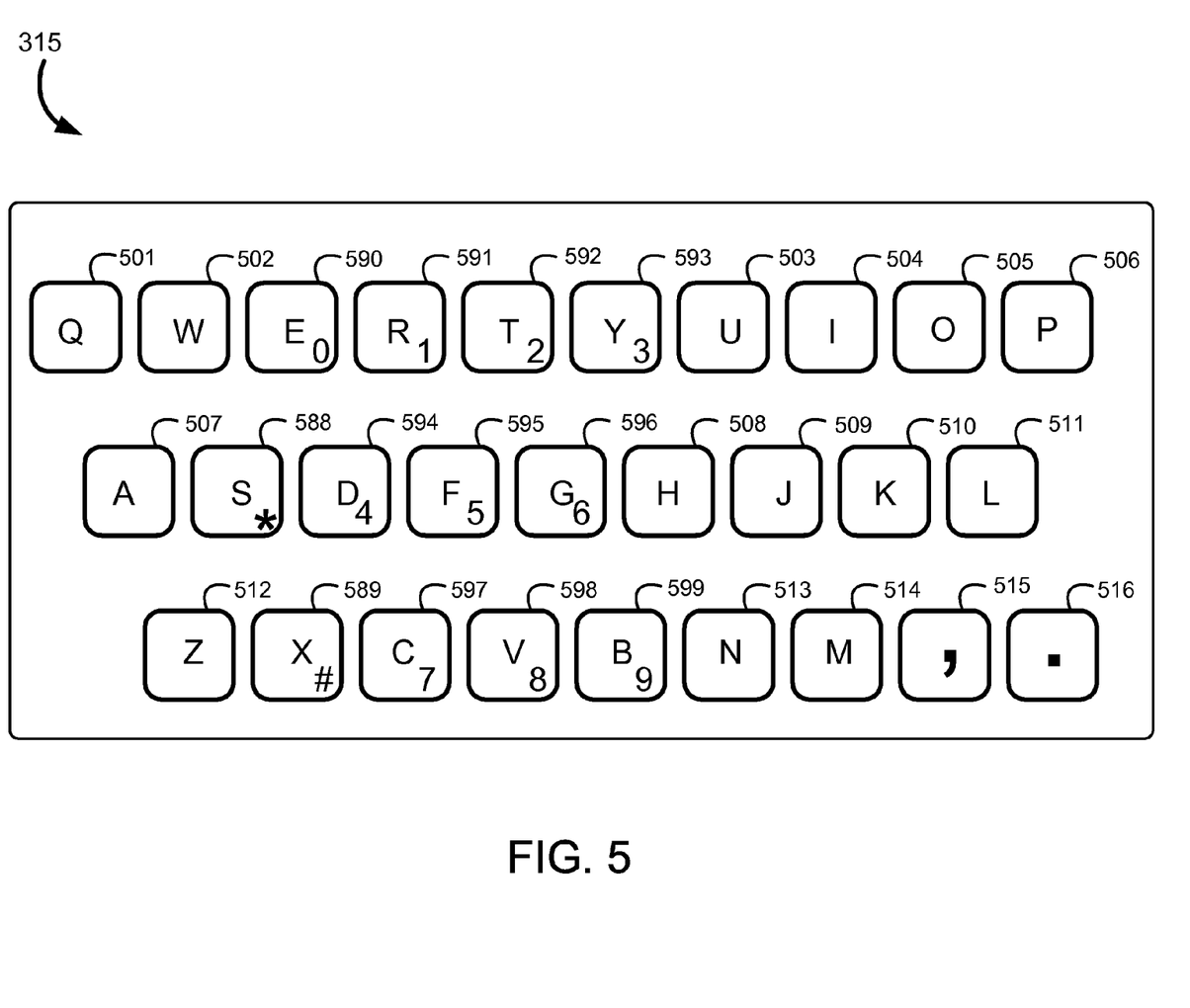
FIG. 5 shows an illustration of a deterministic style keypad, wherein the numerical inputs share a physical key with alphabetical inputs, associated with a mobile device in accordance with an embodiment of the present invention.

FIG. 5 shows an illustration of the Deterministic Keypad 315, or "full" keyboard, wherein the numerical inputs share a physical key with alphabetical inputs. The Deterministic Keypad 315 has one symbol per letter in the Latin set, and 12 keys are labeled with the numbers 0 through 9 and the characters * and # to correspond with the normal touch tone keys.

In this exemplary Deterministic Keypad 315, Dualistic Keys 588, 589, 590, 591, 592, 593, 594, 595, 596, 597, 598 and 599 each provide numeric and alphabetic input. The remaining Alphabetic Keys 501, 502, 503, 504, 505, 506, 507, 508, 509, 510, 511, 512, 513, 514, 515 and 516 provide only a single alphabetic character input.

When the dialer function is invoked in the Mobile Device 110, the input from the User 101 may be received and buffered by the Input Buffer 113. If a numeric sequence is intended, then in general only those keys having a numeric value will have been struck. However, in certain layouts of keyboard, it may be possible to construct words using the alpha labeling entirely within the key set that is also allocated to the numeric function. For example, in the layout shown in exemplary Deterministic Keypad 315, the number 1-800 REDTEST would show up as the numeric sequence 1-800 10420*2 and the number 1-800 FREEBET would be 1-800 5100902. These mnemonics or vanity numbers are illustrated in the Table 1 below; with the telephone number more usually associated with the vanity number shown in the third column.

TABLE 1

| Mnemonic User Input | Alphabetic | Telephone |
|---|---|---|
| 1-800 REDTEST | 1-800 10420*2 | 1-800-733-8378 |
| 1-800 FREEBET | 1-800 5100902 | 1-800 373-3238 |

Figure 6:
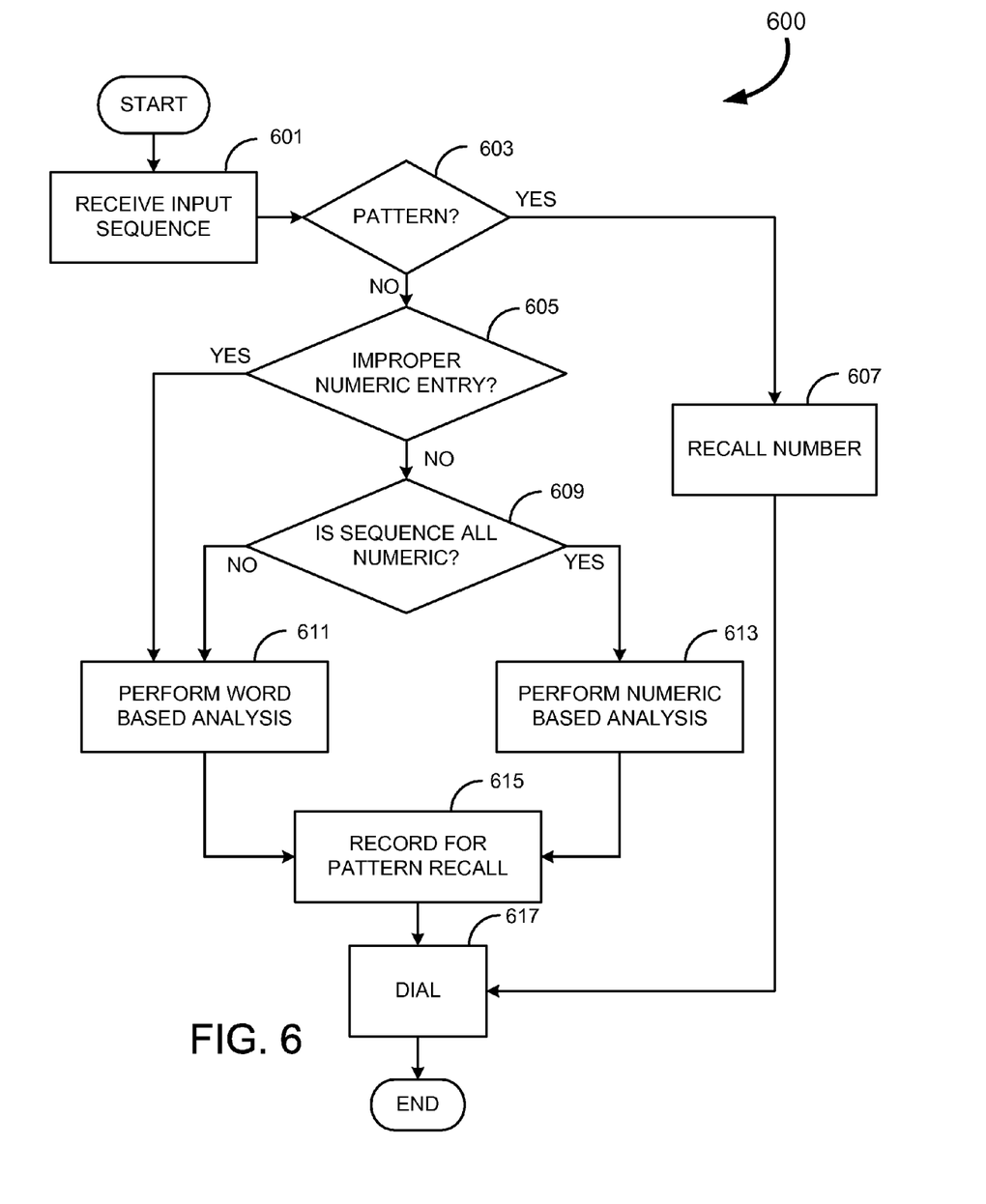
FIG. 6 shows a flow chart illustrating a process of semi-automated dialing in accordance with an embodiment of the present invention.

FIG. 6 shows a flow chart illustrating a process of semi-automated dialing in accordance with an embodiment of the present invention, shown generally at 600. The process begins from step 601 wherein the input is received from the User 101 via the Interface 111. The process then proceeds to step 603 where an inquiry is made as to whether the input adheres to a pattern of dialing which was previously inputted by the User 101 and analyzed previously. If, at step 603 the input does match a previously analyzed input pattern, the process then proceeds to step 607 where the result of the previous input is recalled from a dataset where it had been saved. In these circumstances, complete analysis of the new input is not required, thereby saving time and processing power. The process then proceeds to step 617 where the number is dialed. The process then concludes.

Otherwise, if at step 603 the input is a new input pattern, then the process proceeds to step 605 where an inquiry is made as to whether the input is an improper numeric entry. Improper numeric entry would include situations where the first digit of the seven digit number is a "1" or "0". If the input is an improper numeric entry, the process then proceeds to step 611 where a word based analysis is performed. The process then proceeds to step 615 where the results of the analysis are stored for future recalls when a subsequent input is identical to the analyzed input. The process then proceeds to step 617 where the number resulting from the analysis is dialed. The process then concludes.

Else, if at step 605 the input is a proper numerical input, the process then proceeds to step 609 where an inquiry is made as to whether the input is entirely numeric. If the input is not entirely numeric the process then proceeds to step 611 where a word based analysis is performed. The process then proceeds to step 615 where the results of the analysis are stored for future recalls when a subsequent input is identical to the analyzed input. The process then proceeds to step 617 where the number resulting from the analysis is dialed. The process then concludes.

Otherwise, if at step 609 the input is entirely numeric, the process then proceeds to step 613 where a numeric based analysis is performed. The process then proceeds to step 615 where the results of the analysis are stored for future recalls when a subsequent input is identical to the analyzed input. The process then proceeds to step 617 where the number resulting from the analysis is dialed. The process then concludes.

Figure 7:
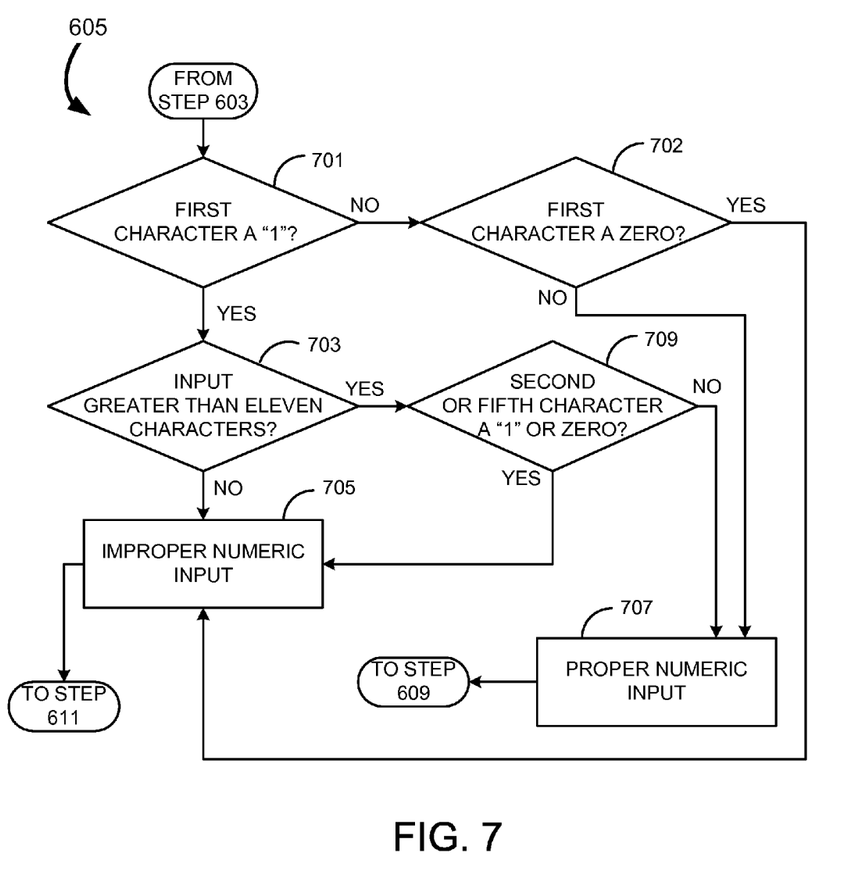
FIG. 7 shows a flow chart illustrating a process of determining improper numeric inputs in accordance with an embodiment of the present invention.

FIG. 7 shows a flow chart illustrating a process of determining improper numeric inputs, shown generally at 605. The process begins from 603 of FIG. 6. The process then proceeds to step 701 where an inquiry is made as to whether the first character of the input is a "1". Such is the case when the Key 591 is struck on the exemplary Deterministic Keypad 315. If the first input is not a "1", the process then proceeds to step 702 where an inquiry is made as to whether the first character of the input is a "0". Such is the case when the Key 590 is struck on the exemplary Deterministic Keypad 315. In the case of the example REDTEST, the fact that the number is outside what is considered to be an acceptable sequence according to telephony signaling convention is evidenced by the appearance of a "1" as the leading digit in the seven trailing digits and also the inclusion of the "A" tone highlighted by the asterisk. It is therefore relatively straightforward to identify that the entered sequence, being an invalid telephony sequence, should not be dialed as entered, but in fact, should be read as an alpha sequence and subsequently ambiguated to resolve the sequence that would result had the entry been made on a conventional telephone keypad. If a zero is dialed for the first character of the input, the process then proceeds to step 705, and the input is an improper numeric input, as defined by dialing conventions. The process then concludes by proceeding to step 611 of FIG. 6.

Else, if at step 702 the first character of the input is not a "0", the process then proceeds to step 707 and the input is proper numeric input, as defined by dialing conventions. The process then concludes by proceeding to step 609 of FIG. 6.

Otherwise, if at step 701 the first character of the input is a "1", the process then proceeds to step 703 where an inquiry is made as to whether the input entry is greater than 11 characters. If the entry is less than 11 characters, the process then proceeds to step 705, and the input is an improper numeric input, as defined by dialing conventions. The process then concludes by proceeding to step 611 of FIG. 6.

Else, if at step 703 the input entry is greater than 11 characters, the process then proceeds to step 709 where an inquiry is made as to whether either the second or the fifth character of the input sequence are either a "1" or a "0". If either the second or the fifth characters of the input sequence are either a "1," or a "0", the process then proceeds to step 705, and the input is an improper numeric input, as defined by dialing conventions. The process then concludes by proceeding to step 611 of FIG. 6.

Otherwise, if at step 709 neither the second nor the fifth character of the input sequence are either a "1" or a "0", the process then proceeds to step 707 and the input is a proper numeric input, as defined by dialing conventions. The process then concludes by proceeding to step 609 of FIG. 6.

Figure 8:
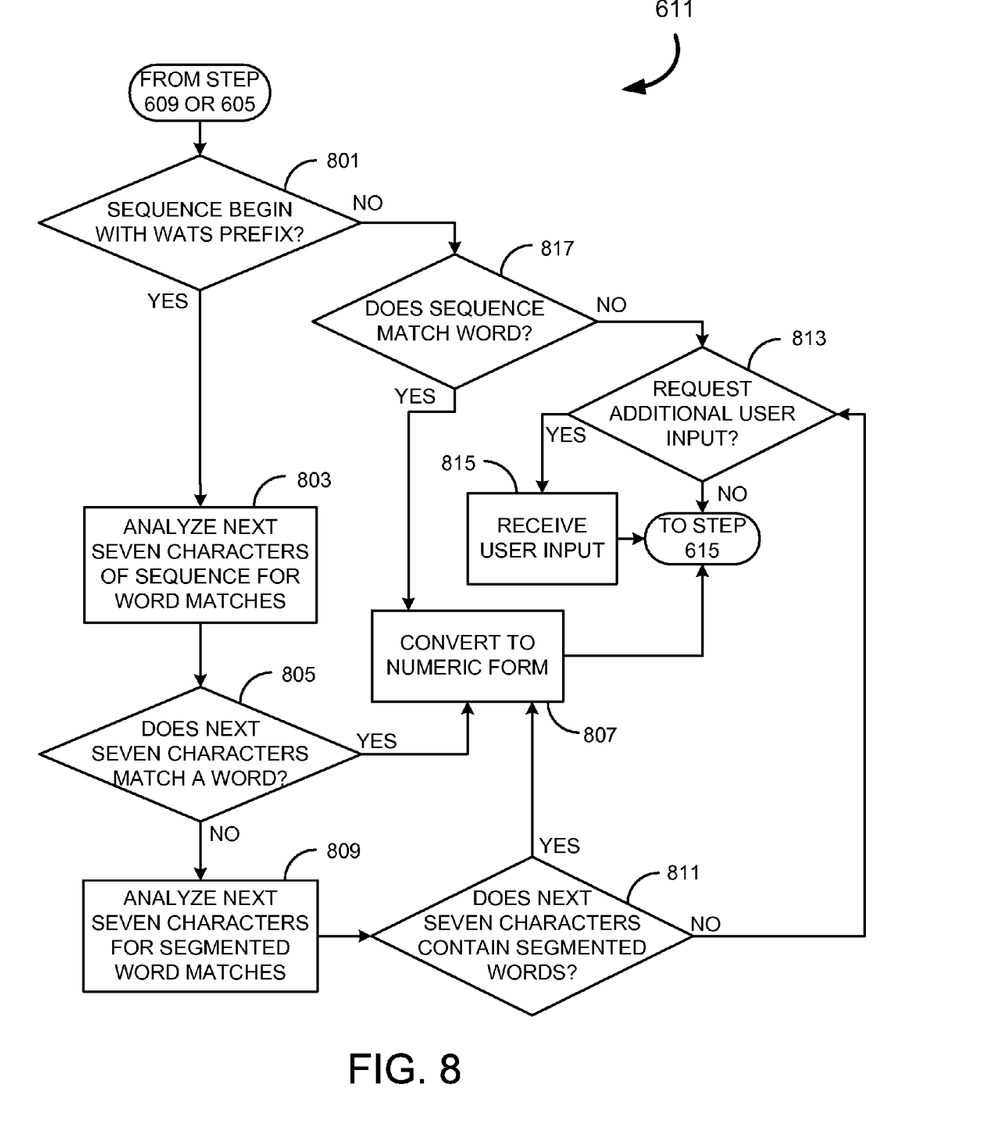
FIG. 8 shows a flow chart illustrating a process of word based analysis in accordance with an embodiment of the present invention.

FIG. 8 shows a flow chart illustrating a process of word based analysis, shown generally at 611. The process begins from 605 or 609 of FIG. 6. The process then proceeds to step 801 where an inquiry is made as to whether the input sequence of characters begins with a WATS prefix, such as 1-800. The WATS prefix inquiry may utilize the WATS Prefix Identifier 211. If the initial characters of the input entry are a WATS prefix, the process then proceeds to step 803 where the next seven characters after the WATS prefix are analyzed for word matches by the Dictionary Querier 215.

The process then proceeds to step 805 where an inquiry is made as to whether the next seven characters after the WATS prefix have a word match. If there is a word match, the words may be converted to numeric form, at step 807, according to the convention illustrated on the Keypad 400 of FIG. 4. The process then concludes by proceeding to step 615 of FIG. 6.

If a terminating sequence following the initial 4 digits exceeds 7 digits in length in the US dialing conventions, then it may reasonably be assumed that the sequence represents a word and only the initial seven digits need be signaled. This may prove intractable with certain word groups because the ambiguity is lost during truncation. For example, the word FLOWERS and the word FLOWERPOTS would result in the same numeric sequence because the letters S and P are both encoded to the number 7 in the keypad of FIG. 4. However, if the vanity sequence 1-FLOWERPOTS were input, this would properly encode to a valid US number of 1-356 9377687.

Else, if at step 805 the next seven characters after the WATS prefix are not a word match, then the process then proceeds to step 809 where the next seven characters after the WATS prefix are analyzed for segmented word matches. Then at step 811 where an inquiry is made as to whether the next seven characters after the WATS prefix contain segmented word matches. An example of a segmented word match includes numbers such as 1-800-GO-U-HAUL. The words "GO" and "HAUL" would each be matched to a dictionary entry. The character "U" may, in some embodiments, be recognized as a phonetic variant for the word "you", common to vanity style telephone numbers.

If at step 811 the next seven characters after the WATS prefix contain segmented word matches, the process then proceeds to step 807 where the words may be converted to numeric form according to the convention illustrated on the Keypad 400 of FIG. 4. The process then concludes by proceeding to step 615 of FIG. 6.

Otherwise, if at step 811 the next seven characters after the WATS prefix do not contain segmented word matches, the process then proceeds to step 813 where an inquiry is made as to whether additional User 101 input is requested. If additional information is requested, the process then proceeds to step 815 where the User 101 input is received. The process then concludes by proceeding to step 615 of FIG. 6.

Else, if no User 101 input is requested at step 813, the process then concludes by proceeding to step 615 of FIG. 6.

This request for additional input may consist of a display box of possible numbers for dialing and a request that the User 101 select the correct number from the list. The possible numbers for dialing may include conversion of all keys struck to numeric values via the conventions illustrated on the Keypad 400 of FIG. 4. Additionally, another displayed number for dialing may default by choosing the numerical value of any Dualistic Keys 588, 589, 590, 591, 592, 593, 594, 595, 596, 597 598 and 599 struck. Additionally, in some embodiments, a combined number may be displayed, such as when any partial word matches may be converted, while non word matches may be the default numeric value. Lastly, the User 101 may be able to re-input the entry in the case when none of the displayed numbers for dialing are correct. Below at Table 2 are examples of the numbers for dialing displayed to the User 101 when requesting further User 101 input. In this example, the number 1-800-GRTCARS is entered. The segment "CARS" is recognized within the Standard Dictionary 115, however the term "GRT" a phonetic abbreviation for "great" is not within the exemplary Standard Dictionary 115.

TABLE 2

| Mnemonic User Input | Action | Result |
| --- | --- | --- |
| Mnemonic User Input | | 1-800-GRT-CARS |
| Display 1 | Convert all letters to numeric | 1-800-478-2277 |
| Display 2 | Interpret ambiguous entry as numeric | 1-800-612-721* |
| Display 3 | Convert known words | 1-800-612-2277 |

Note that the number in the Table 2 titled Display 2 includes an invalid number due to the inclusion of an "*". In these situations, the invalid number may be omitted from display to the User 101.

Returning to step 801, if the input sequence of characters does not begin with a WATS prefix, the process then proceeds to step 817 where an inquiry is made as to whether the sequence inputted by the User 101 matches a word. This inquiry may utilize the Dictionary Querier 215. If the input matches a word, the process then proceeds to step 807 where the word may be converted to numeric form according to the convention illustrated on the Keypad 400 of FIG. 4. The process then concludes by proceeding to step 615 of FIG. 6.

Else, if at 817 the sequence inputted by the User 101 does not match a word, the process then proceeds to step 813 where an inquiry is made as to whether additional User 101 input is requested. If additional information is requested, the process then proceeds to step 815 where the User 101 input is received. The process then concludes by proceeding to step 615 of FIG. 6. Else, if no User 101 input is requested, the process then concludes by proceeding to step 615 of FIG. 6.

Figure 9:
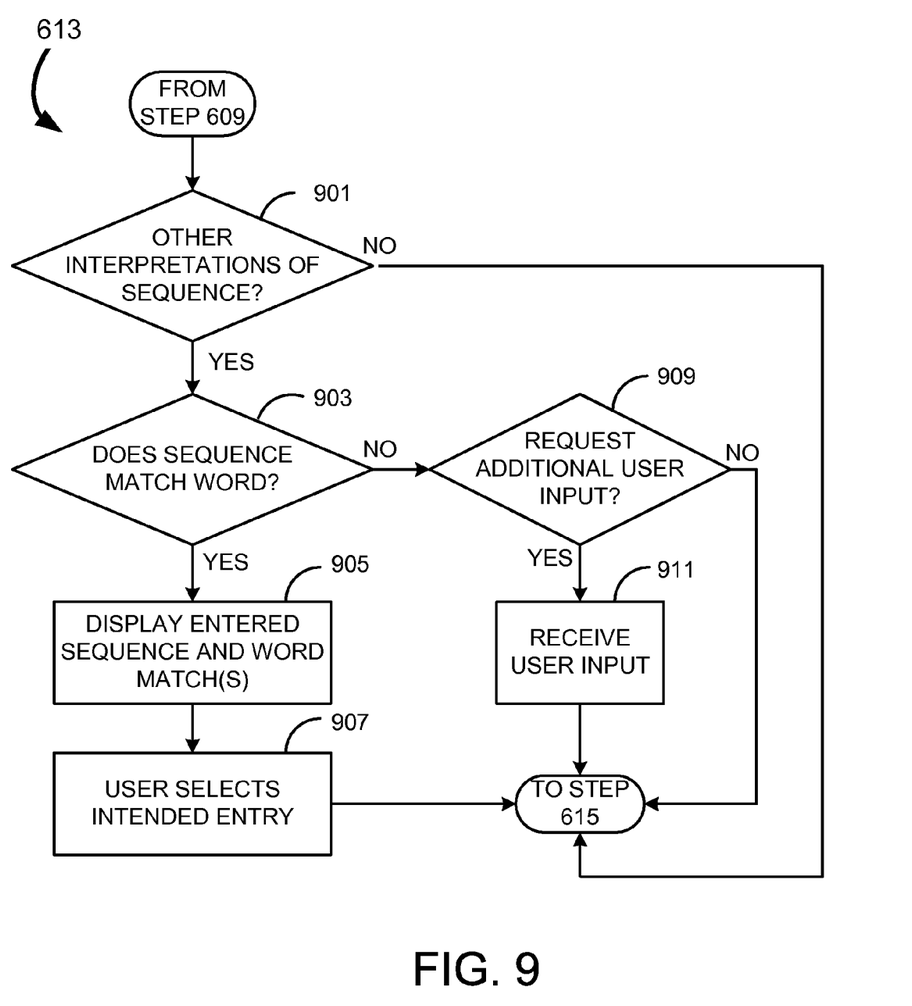
FIG. 9 shows a flow chart illustrating a process of numeric based analysis in accordance with an embodiment of the present invention.

FIG. 9 shows a flow chart illustrating a process of numeric based analysis, shown generally at 613. The process then begins from step 609 of FIG. 6. The process then proceeds to step 901 where an inquiry is made as to whether other interpretations of the input sequence are possible beyond a simple numeric sequence. This inquiry may be determined by identifying word parts within the sequence. If there are no other interpretations of the input sequence, the process then concludes by proceeding to step 615 of FIG. 6. This would occur when the numeric sequence is the intended output. Most dialing entries by the User 101 would belong to this category.

Else, if at step 901 other interpretations of the input sequence beyond a simple numeric sequence are possible, the process then proceeds to step 903 where an inquiry is made as to whether the input sequence matches any words. This may occur in the case of the previous example of 1-800 FREEBET since there are valid telephone and alphabetic interpretations. See the above illustrated Table 2.

If at step 903 the input sequence matches a word, the process then proceeds to step 905 where the numeric input sequence and any additional word matches may be displayed to the User 101. Then, at step 907, the User 101 may select the intended entry. The process then concludes by proceeding to step 615 of FIG. 6.

In the case of the FREEBET example, the numeric sequence resulting from the entry of the word as an alphabetic string on the keyboard of FIG. 5 is 5100902. This is a valid signaling code according to telephony conventions and it is impossible to discern whether in fact this is the intended number or a vanity number. If the latter, the actual sequence according to FIG. 4 would be 3733238. Either might be a valid number in the exchange area where it was dialed.

Therefore, the key sequence may be progressively matched against an internal dictionary to permit the display of other interpretations of the key sequence to be identified. In the case of a telephone application, the User 101 may check the dialed sequence prior to pressing the send key. The User 101 may now select the intended representation from the displayed list. Use of a good quality dictionary and algorithms that have a heuristic bias applied may result in the intended sequence being displayed early in the candidate list.

Certain sequences of an input entry may prove to be resistant to easy analysis but by referencing internal dictionary functions that are now commonplace on modern personal telephony appliances, the likely intended use may be displayed. Vanity sequences which have the numeric values 1, 2 and 4 embedded in the sequence as "acoustic" substitutes for the words "one" "to" and "for" may generally have a logical structure that uses letter or word sequences before and after the embedded numeral.

Otherwise, if at step 903 the input sequence does not match a word, the process then proceeds to step 909 where an inquiry is made as to whether additional User 101 input is requested. If additional information is requested, the process then proceeds to step 911 where the User 101 input is received. The process then concludes by proceeding to step 615 of FIG. 6. Else, if no User 101 input is requested at step 909, the process then concludes by proceeding to step 615 of FIG. 6.

It should be evident to the skilled man in the art that a similar system construct may exist for any telephony zone and that the invention may be practiced with minor changes to accommodate local considerations.

In sum, the present invention relates generally to semi-automated dialing system and method to provide fast, accurate and resource efficient dialing of ambiguous dialing entries from a deterministic keypad where the numeric and alphabetic inputs share a physical key. In this way the semi-automated dialing system and method may provide an invaluable tool for device manufacturers and device users.

While this invention has been described in terms of several preferred embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer implemented method for semi-automated dialing, useful in association with a personal appliance having a display, a standard keyboard upon which some keys have both a numeric or symbolic and alphabetic interpretation and a microprocessor capable of dialing an input sequence from the alphabetic, numeric, or symbolic keys or a combination of both, the method for semi-automated dialing comprising:

receiving an input from the keyboard, wherein the input includes a sequence of characters, wherein said sequence of characters is determined to be a proper numeric or symbolic sequence of characters where a proper numeric or symbolic sequence of characters does not include a first digit that is "1" or a "0" and wherein each character of said sequence is determined to be a numeric or symbolic character;

determining if the received input has an alternate interpretation, wherein said alternate interpretation comprises at least an acceptable sequence according to a telephony signaling convention;

displaying the received input along with any alternate interpretations on the display;

receiving a selection from a user, wherein the selection is chosen from the displayed input and alternate interpretations; and dialing the selection.

2. The method of semi-automated dialing, as recited in claim 1, wherein the determining if the received input has an alternate interpretation includes comparing the sequence of characters with a list of words stored in a dictionary.

3. The method of semi-automated dialing, as recited in claim 2, wherein the list of words includes a list of at least one vanity number used in a wide-area telephone service system.

4. The method of semi-automated dialing, as recited in claim 2, wherein the comparing the sequence of characters with a list of words stored in a dictionary includes utilizing the alphabetic interpretation of the keys.

5. The method of semi-automated dialing, as recited in claim 3, wherein the list of at least one vanity number may be dynamically configured.

6. The method of semi-automated dialing, as recited in claim 5, wherein the configuration of the list of at least one vanity number may be remotely populated.

7. A computer implemented method for semi-automated dialing, useful in association with a personal appliance having a display, a standard keyboard upon which some keys have a numeric or symbolic and alphabetic interpretation and a microprocessor capable of dialing an input sequence from the alphabetic, numeric, or symbolic keys or a combination thereof, the method for semi-automated dialing comprising:

receiving an input from the keyboard, wherein the input includes a sequence of characters, wherein said sequence of characters is determined to be a proper numeric or symbolic sequence of characters, where a proper numeric or symbolic sequence of characters does not include a first digit that is "1" or a "0";

determining if the sequence of characters consists of input from the keys that have numeric or symbolic and alphabetic interpretation and wherein each character of said sequence is determined to be a numeric or symbolic character;

if the characters consist of input from the keys that have both numeric or symbolic and alphabetic interpretation, then performing a numeric analysis on the sequence of characters; and else, if the characters comprise input from the keys that do not have both numeric or symbolic and alphabetic interpretation, then performing a word analysis on the sequence of characters.

8. The method of semi-automated dialing, as recited in claim 7, wherein the performing a numeric analysis on the sequence of character further comprises:

determining if the received input has an alternate interpretation if the received input has an alternate interpretation, then receiving user input, wherein the receiving user input comprises:

displaying the received input along with any alternate interpretations on the display;

receiving a selection from a user, wherein the selection is chosen from the displayed input and alternate interpretations;

dialing the selection; and else, if the received input does not have an alternate interpretation, then dialing the received input.

9. The method of semi-automated dialing, as recited in claim 8, wherein the performing a word analysis on the sequence of character further comprises:

searching for at least one word match between the received input and a corpus;

converting the characters of the sequence of characters, which match at least one word in the corpus, into numbers by utilizing telephone convention; and dialing the numbers generated by converting the characters.

10. The method of semi-automated dialing, as recited in claim 9, wherein determining if the received input has an alternate interpretation includes comparing the sequence of characters with a list of words stored in a dictionary.

11. The method of semi-automated dialing, as recited in claim 10, wherein the list of words includes a list of at least one vanity number used in a wide-area telephone service system.

12. The method of semi-automated dialing, as recited in claim 10, wherein the comparing the sequence of characters with a list of words stored in a dictionary includes utilizing the alphabetic interpretation of the keys.

13. The method of semi-automated dialing, as recited in claim 11, wherein the list of at least one vanity number may be dynamically configured.

14. The method of semi-automated dialing, as recited in claim 13, wherein the configuration of the list of at least one vanity number may be remotely populated.

15. A semi-automated dialing system, useful in association with a user, the system comprising:

a display, a standard keyboard upon which some keys have both a numeric or symbolic and alphabetic interpretation and a microprocessor capable of dialing an input sequence from either the alphabetic, numeric, or symbolic keys or a combination thereof, the system for semi-automated dialing comprising:

a keyboard configured to enable receiving of an input of a sequence of characters, and wherein the keyboard includes at least one key having a numeric or symbolic and alphabetic interpretation;

a dialer analyzer configured to determine if the received input has an alternate interpretation, wherein the received input is a sequence of characters that is determined to be a proper numeric or symbolic sequence of characters where a proper numeric or symbolic sequence of characters does not include a first digit that is "1" or a "0" and wherein each character of said sequence is determined to be a numeric or symbolic character;

a display configured to display the received input along with any alternate interpretations, wherein any alternate interpretations is an acceptable sequence according to a telephony signaling convention;

an interface configured to receive a selection from the user, wherein the selection is chosen from the displayed input and alternate interpretations; and a wireless connector configured to dial the selection.

16. The semi-automated dialing system of claim 15, further comprising at least one dictionary and a word identifier configured to compare the sequence of characters with a list of words stored in the at least one dictionary.

17. The semi-automated dialing system of claim 16, wherein the at least one dictionary includes a wide-area telephone service system directory including a list of at least one vanity number.

18. The semi-automated dialing system of claim 17, wherein the word identifier configured to compare the sequence of characters with a list of words stored in the at least one dictionary includes utilizing the alphabetic interpretation of the keys.

19. The semi-automated dialing system of claim 17, wherein the wide-area telephone service system directory may be dynamically configured.

20. The method of semi-automated dialing, as recited in claim 19, wherein the wide-area telephone service system directory may be remotely populated.

* * * * *